(12) United States Patent
Luechinger et al.

(10) Patent No.: US 8,042,711 B2
(45) Date of Patent: Oct. 25, 2011

(54) DOSAGE-DISPENSING DEVICE WITH A RECEIVING DEVICE FOR AN INSERTION UNIT

(75) Inventors: Paul Luechinger, Uster (CH); Marc Zehnder, Volketswil (CH); Eduard Fringeli, Bubikon (CH)

(73) Assignee: Mettler-Toledo AG, Greifensee (CH)

( * ) Notice: Subject to any disclaimer, the term of this patent is extended or adjusted under 35 U.S.C. 154(b) by 871 days.

(21) Appl. No.: 12/030,307

(22) Filed: Feb. 13, 2008

(65) Prior Publication Data
US 2008/0190518 A1   Aug. 14, 2008

(30) Foreign Application Priority Data
Feb. 13, 2007 (EP) .................................. 07102298

(51) Int. Cl.
*B65D 88/54* (2006.01)

(52) U.S. Cl. ................ 222/325; 222/160; 222/181.3; 222/380; 414/744.3; 141/284; 141/391; 248/221.11; 248/222.13; 248/224.7; 248/675

(58) Field of Classification Search ............ 222/180, 222/181.1, 181.3, 325, 380, 146.5, 160; 414/741, 414/744.3; 126/333, 337 A, 337 R, 339; 141/284, 390–391; 248/220.21, 221.11, 248/222.12, 222.13, 224.7, 675; 211/89.01, 211/90.01, 94.01; 399/107, 111, 113
See application file for complete search history.

(56) References Cited

U.S. PATENT DOCUMENTS

| 5,145,009 | A | 9/1992 | Mheidle et al. |
| 7,147,134 | B2* | 12/2006 | Gutierrez et al. ........... 222/146.1 |
| 2004/0173549 | A1* | 9/2004 | Herron et al. ............... 211/90.02 |
| 2005/0183389 | A1* | 8/2005 | Craig et al. ...................... 53/397 |
| 2006/0127129 | A1* | 6/2006 | Jung et al. ...................... 399/111 |

FOREIGN PATENT DOCUMENTS
CH   361381 A   4/1962

OTHER PUBLICATIONS
Machine Translation of CH 361,381, Heinrich Surber.*
European Search Report.
* cited by examiner

*Primary Examiner* — Kevin P Shaver
*Assistant Examiner* — Andrew Bainbridge
(74) *Attorney, Agent, or Firm* — Buchanan Ingersoll & Rooney PC

(57) ABSTRACT

A receiving device in a dosage-dispensing device, which serves to receive any insertion unit that can be inserted in the receiving device, includes a plurality of support arms that are arranged parallel to each other and extend in their lengthwise direction substantially orthogonal to the direction of gravity. At least two support arms are arranged in planes lying above one another relative to the direction of gravity. Each support arm includes at least one support location, so that, when the dosage-dispensing device is in its operating state, the insertion unit can be supported through the support locations against the force of gravity. Each support arm includes at least one protrusion which serves to position the insertion unit in a plane that extends orthogonal to the direction of gravity. The main dimension of the protrusion is directed essentially against the direction of gravity. When the insertion unit is inserted in the receiving device, the protrusions reach into recesses that are formed on the insertion unit.

19 Claims, 4 Drawing Sheets

DOSAGE-DISPENSING DEVICE WITH A RECEIVING DEVICE FOR AN INSERTION UNIT

RELATED APPLICATION

This application claims priority under 35 U.S.C. §119 to European Patent Application No. 07102298.2 filed in the European Patent Office on Feb. 13, 2007, the entire content of which is hereby incorporated by reference in its entirety.

TECHNICAL FIELD

A dosage-dispensing device with a receiving device for an insertion unit, a receiving device for an insertion unit, and an insertion unit are disclosed.

BACKGROUND INFORMATION

Dosage-dispensing devices for substances in powder- or paste form find application in particular in dispensing small quantities with high precision into small target containers. Frequently, such recipient containers are placed on a balance in order to weigh the substance delivered out of the dosage-dispensing device, so that the substance can subsequently be further processed according to given specifications.

The substance to be dispensed is contained for example in a dosage-dispensing unit which includes a source container and a dispensing head. It is desirable to deliver the substance to the outside through a small outlet opening in the dosage-dispensing device, so that the substance can be filled in a targeted stream also into a container with an opening of narrow cross-section.

Dosage-dispensing devices for dry and/or powdery substances, for example color dye powders belong to the known state of the art and are in current use. For example in U.S. Pat. No. 5,145,009 A, a dosage-dispensing device is described which includes a holder device with a receiving device and a dosage-dispensing unit. Arranged at the underside of the dosage-dispensing dispensing unit is a delivery orifice which can be opened and closed by a linear movement of a closure element. The function of the closure element is performed by a cone-shaped valve body whose diameter decreases in the upward direction. The delivery orifice is opened by lowering the vertical position of the cone-shaped valve body, which also rotates while it is in the open position and is equipped with means for advancing the substance in the direction of the delivery orifice. The dosage-dispensing unit is furthermore traversed by a drive shaft which protrudes from the top of the dosage-dispensing unit, where it is coupled to a drive source. The dosage-dispensing unit is connected at its underside to the dosage-dispensing device. The cover of the dosage-dispensing unit is functionally coupled to several pressure cylinders, through which the outlet orifice and thus the delivery rate from the dosage unit can be influenced. In dosage-dispensing devices of this kind the valve body is constrained as much as possible in a play-free manner in the dosage-dispensing unit, in order to allow the substance to be dispensed in accurate dosage quantities. Furthermore, the dispensing of doses in the microgram range involves very rigid connections between the drive source and the dosage unit that is inserted in the receiving device, because in the end phase of the dosage-dispensing process, the remaining dosage quantity is dispensed through the most minute changes of the angle of rotation and of the linear vertical position of the valve body.

The dosage-dispensing unit is set into a ring-shaped recess of the receiving device and its position is thereby defined in relation to the drive shaft and the pressure cylinders. The seating contact surface of the dosage-dispensing unit is arranged on the same plane as the delivery orifice. As the pressure cylinders apply pressure to the cover of the dosage-dispensing unit, the latter is held captive in the receiving device. In order to achieve the best seating support possible with regard to the pressure force, a large support surface is necessary. While the large diameter of the support surface and the ring-shaped constraint of the dosage-dispensing unit due to the ring-shaped recess ensure that the dosage-dispensing unit will not tip out of the ring-shaped recess as a result of asymmetric pressure forces acting on the cover, the large diameter of the support surface and the ring-shaped constraint make it difficult to achieve a compact design of the receiving device and also of the dosage-dispensing device. In this receiving device for dosage-dispensing units, substance from the dispensing process can accumulate in the ring-shaped recess between the seating surface of the dosage-dispensing unit and the receiving surface of the receiving device. A one-sided local accumulation of substance between the receiving surface and the seating surface can further lead to angular misalignment of the dosage-dispensing device relative to the receiving device, whereby the dispensing operation or the exchanging of the dosage-dispensing unit can be compromised due to distortion-causing stresses.

SUMMARY

An exemplary receiving device in which any insertion unit can be exchanged simply and quickly is disclosed, which is of a compact configuration, and which is insensitive to undesirable substance deposits.

A receiving device in a dosage-dispensing device is disclosed, which is configured to receive an insertion unit that can be inserted in the receiving device, wherein the receiving device comprises a plurality of support arms that are arranged parallel to each other and extend in their lengthwise direction substantially orthogonal to a direction of gravity, wherein at least two of said support arms are arranged in planes lying above one another relative to the direction of gravity; at least two of the support arms each comprise at least one support location, and in an operating state of a dosage-dispensing device the support locations are configured to support an insertion unit against a force of gravity by way of seating locations that are formed on the insertion unit; each support arm comprises at least one protrusion configured to position the insertion unit in a plane that extends orthogonal to the direction of gravity, a main dimension of the protrusion being directed essentially against the direction of gravity and, when an insertion unit is inserted in the receiving device, the protrusions reach into recesses that are formed on the insertion unit.

BRIEF DESCRIPTION OF THE DRAWINGS

Details of dosage-dispensing devices according to the disclosure are presented in the description of the embodiments that are illustrated in the drawings, wherein.

DETAILED DESCRIPTION

Figure 1:
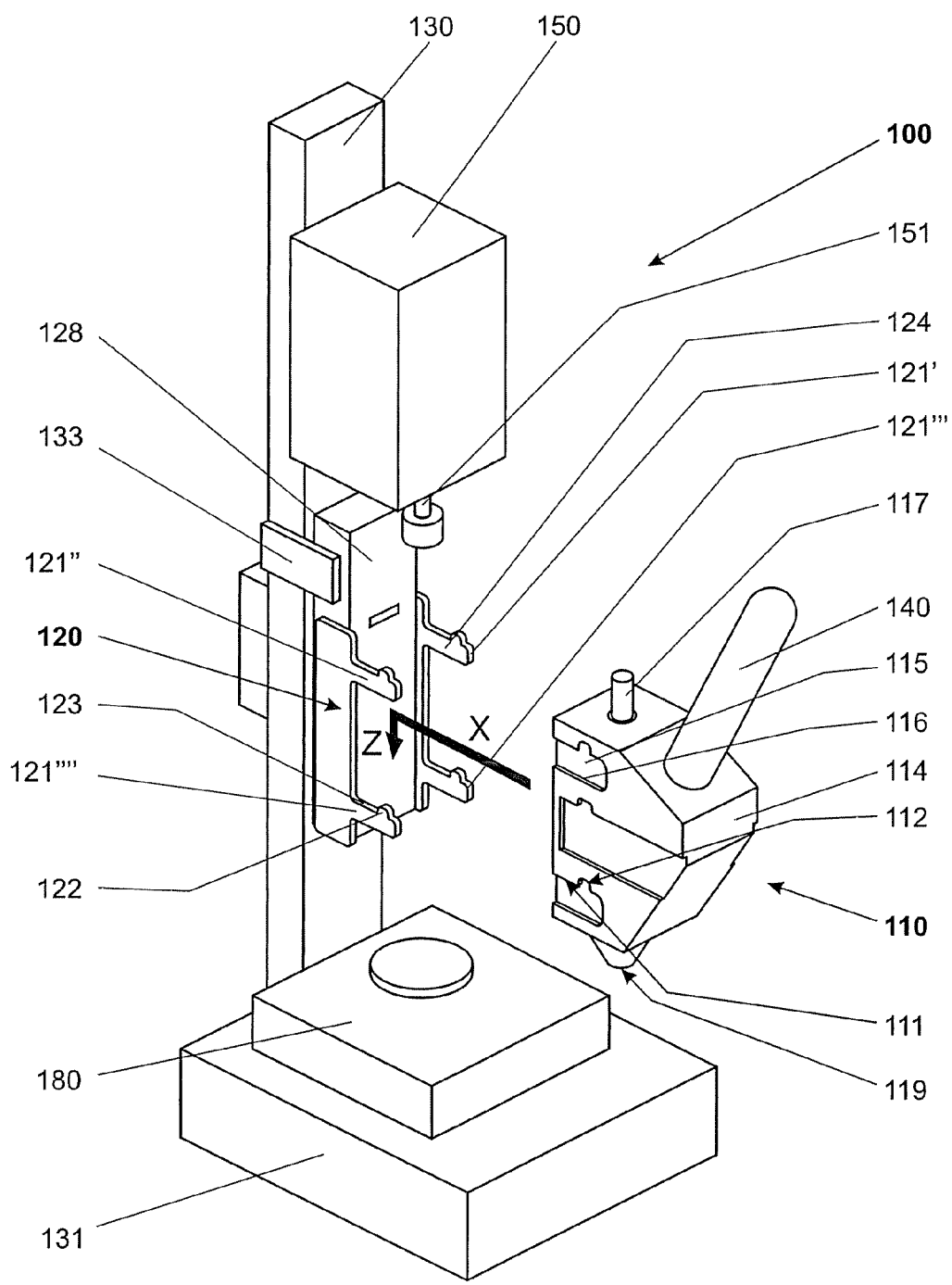
FIG. 1 is a schematic three-dimensional illustration of an exemplary dosage-dispensing device with a holder device, a receiving device with four support arms which is connected to the holder device, a force-measuring device and a insertion unit that can be inserted in the receiving device.

An exemplary receiving device in a dosage-dispensing device, configured to receive any unit that is compatible to be inserted in the receiving device, includes a plurality of support arms that are arranged parallel to each other and extend in their lengthwise direction substantially orthogonal to the direction of gravity. At least two of these support arms are arranged at different levels above one another relative to the direction of gravity. At least two of these support arms each comprise at least one support location, wherein in the operating state of the dosage-dispensing device said support locations serve to support the insertion unit against the force of gravity by way of seating locations that are formed on the insertion unit. Each support arm comprises at least one protrusion which serves to position the insertion unit in a plane that extends orthogonal to the direction of gravity. The main dimension of the protrusion is directed essentially against the direction of gravity. When the insertion unit is inserted in the receiving device, the protrusions reach into recesses that are formed on the insertion unit. The protrusions and the support locations cooperate with the recesses and seating locations to establish in essence a form-fitting connection between the receiving device and the insertion unit.

An exemplary dosage-dispensing device includes a holder device on which the receiving device is arranged in such a way that when the insertion unit is inserted in the receiving device, enough free space remains available below the insertion unit, so that a target container into which for example a substance dose is to be dispensed can be set up in this free space. On the holder device, there can further be a drive device arranged which, by way of a mechanical connection such as a drive shaft, can actuate mechanically movable components of the insertion unit. If the insertion unit is a dosage-dispensing unit, the movable mechanical components can be a closure shaft and a closure body which serve to close a delivery orifice that is formed on the underside, relative to the operating condition of the apparatus.

When referring to the operating condition of the dosage-dispensing device, what is meant is a condition in which the apparatus is ready to operate. This means that at least one insertion unit is inserted in the receiving device. However, it is not yet necessary at this point for the dosage-dispensing unit to be coupled to a drive device of the dosage-dispensing device. The coupling operation can for example be part of the dosage-dispensing process. Normally, the substance carried out of the dosage-dispensing unit is dispensed into a target container which is set up on the load receiver of a force-measuring device, in particular a balance. The function of the force-measuring device is not limited to measuring and indicating the quantity of substance that was dispensed into the target container. The instantaneous measurement value, which during the dosage-dispensing process is updated continuously by the force-measuring device, can be sent to a control- and regulation device which compares the measurement value to a target value that has been set by the user and which responds accordingly by opening or closing the outlet orifice of the dosage-dispensing device by way of the drive device.

By dividing the support among several support locations, one can prevent the problem associated with a single support location with a large surface on which for example pulverous dosage material could accumulate. The total surface size of the support locations can further be reduced to a size that is necessary to sustain the surface load pressure, given that torques which act on the insertion unit, for example as a result of the bearing friction of a closure shaft that is rotatably constrained in the insertion unit, as well as tipping moments acting on the insertion unit are taken up by the protrusions rather than by a large support surface.

With the arrangement of at least two support arms on two levels above one another, the receiving device can further be designed in a very compact configuration.

The protrusions can have an arbitrary shape, and can for example be designed to be easy to produce, such as for example a cylindrical, cube-shaped, conical, frusto-conical or hemispherical outline configuration. Due to the fact that the protrusions, originating from their respective support arms, extend against the direction of gravity, a direction for the installation is defined in the direction of gravity, and a direction for the removal is defined against the direction of gravity.

The support locations and the protrusions do not necessarily have to be separate elements. The protrusions can also serve as support locations at the same time. The protrusions can also be of a configuration such as for example cone-shaped which allows any play between the receiving device and the insertion unit to be eliminated.

This receiving device can comprise four support arms, with each of the support arms having one protrusion. The support arms are arranged in pairs, with the arms of each pair being located, respectively, at the same level, so that the insertion unit in its operating condition is arranged essentially between the two support arms at each of the two levels. The insertion unit is thereby held captive between the support arms, whereby an additional measure of safety is provided that the dosage-dispensing unit will not fall out of the receiving device as a result of vibrations.

In an insertion unit which comprises at least one delivery orifice, the latter can be arranged at a location which is below the support arms and consequently below the seating locations when the dosage-dispensing unit is in its operating position. As a result, a problem of undesirable deposits forming at the support locations and the seating locations can largely disappear.

In order to alleviate the mechanical stress on the protrusions, static moments acting on the insertion unit can be taken up by suitable counterpart surface areas that are formed on the dosage-dispensing unit. For the purpose of taking up static moments, the receiving device can therefore comprise guiding flanks, such as at least one guiding flank on each support arm, which rest against the counterpart surface areas when the dosage-dispensing device is in its operating condition.

In order to achieve a simple and cost-effective manufacturing process of the receiving device, each support arm can be made as a sheet metal part, with the thickness of the support arms and protrusions corresponding to the thickness of the sheet metal material. The support arms can, of course, also be made of a polymer material.

As described above, the directions of insertion and removal of the insertion unit can be defined by the shape and orientation of the protrusions. The drive device can be arranged as a part of the dosage-dispensing device above the receiving device and thus also above the installed insertion unit. By coupling the drive unit to the insertion unit, the insertion unit can for example be prevented from being moved in the uninstalling direction.

It is conceivable that a movement of the insertion unit in the uninstalling direction cannot be prevented by the aforementioned coupling due to design reasons, or that the insertion unit is pulled out of the receiving device in the uninstalling direction during the process of uncoupling for example due to jamming of the coupling connection. An exemplary embodiment can include a locking element on the dosage-dispensing device which prevents a movement of the insertion unit against the direction of gravity.

As mentioned above, the insertion unit can have certain features that enable it to be inserted in as well as removed from a receiving device of the foregoing description. At least two seating locations can be therefore formed on the insertion unit, whereby the latter can be supported against the direction of gravity by the support locations of the support arms. Furthermore, at least two recesses are formed on the insertion unit which can be engaged by the protrusions of the support arms when the unit is inserted in the receiving device.

Although exemplary embodiments encompass a dosage-dispensing device, the insertion unit does not necessarily have to be a dosage-dispensing unit. The insertion unit can be, for example, a dosage-dispensing unit for substance doses in powder- or paste form, a titrator unit, a pump unit, a unit with pipe conduits and armatures, a container unit, a sensor unit, or an adapter serving to receive one of these units or further units. Such further units can include for example stirring devices, grinding mills or heating- and/or cooling units which are configured as insertion units that can be inserted in the receiving device. Due to the fact that there is an entire selection of different insertion units available, the dosage-dispensing device finds application not only for the dispensing of substances in powder- or paste form, but it can also be expanded into a kind of mini-laboratory for the further processing of the dosage material, wherein weight values can be measured continuously by way of the force-measuring device.

The above-described guide surface areas of the receiving device in cooperation with the counterpart surface areas of the insertion unit can not only serve to take up static moments (also referred to as torques), but can also function as insertion aids. The insertion unit is equipped for this purpose with preferably at least two counterpart surface areas, which rest against the guide surface areas of at least two support arms when the unit is in its installed state. A particularly user-friendly design can be achieved if the support arm and/or the counterpart surface areas comprises insertion-assisting surfaces and/or insertion-guiding flanks, for example rounded or beveled edges. If the distance of the counterpart surface areas is slightly larger than the distance of the guide surface areas, the support arms will be pushed apart elastically when the insertion unit is inserted. As a result, the insertion unit is held in the receiving device with absolutely no play.

If signals and/or electrical energy need to be transmitted from the dosage-dispensing device to the insertion unit or vice versa, at least one counterpart surface area of the insertion unit and the guide surface area that is in contact with said counterpart surface area in the operating state can be equipped with electrically conductive contact terminals.

Guide surface areas of this kind are of advantage particularly if the insertion unit is manually inserted in the receiving device by the user. However, this operation can also be automated by means of a handling device for insertion units. To allow the handling device to securely set the insertion device into the receiving device or remove it from the receiving device, at least one holder element is formed on, or connected to, the insertion unit. The handling device comprises at least one receiver element which is configured for a form-fitting match with the holder element. This receiver element can include a locking device which serves to establish a form-fitting or force-locked connection between the handling device and the holder element, so that by means of the locking device the at least one insertion unit can be locked into the receiver element during a process of inserting the insertion unit in, or removing it from the receiving device.

As has already been described in detail, the dosage-dispensing device includes a drive device. As the drive device may need to be coupled to the insertion unit, it is very advantageous to arrange at least one receiving device on the drive device, because this direct connection allows the use of narrow tolerances in regard to shapes and locations.

FIG. 1 shows a schematic three-dimensional representation of an exemplary dosage-dispensing device 100. The latter is equipped in essence with a holder device 130 with a foot 131 on which a force-measuring device 180 is arranged. A receiving device 120 is connected to the holder device 130. The receiving device 120 comprises four support arms 121', 121", 121', 121', which extend with their longitudinal direction oriented essentially orthogonal to the direction of gravity. A support location 123 is formed on the topside, i.e. the side facing against the direction of gravity, of each of the support arms 121', 121", 121', 121'. Also on the topside of each of the support arms 121', 121", 121, 121'a protrusion 122 is formed which extends against the direction of gravity.

As illustrated in FIG. 1, the protrusion 122 is arranged in the area of the support location 123 and extends, or rather rises, above the support location 123, so that the support location 123 is divided into two parts by the protrusion 122. However, this is only one of several possibilities of implementing an exemplary embodiment. There is no compelling requirement for the support location 123 and the protrusion 122 of each support arm 121', 121", 121', 121' to be arranged in close proximity to each other. Also, it is not necessary for each of the support arms 121', 121", 121', 121' to comprise a protrusion 122. As an example, a concentric arrangement of a cylinder-shaped protrusion 122 surrounded by a ring-shaped support location 123 is likewise possible.

The support arms 121', 121", 121', 121' are arranged parallel to each other in pairs that lie in planes above one another. With this configuration and arrangement of the support arms 121', 121", 121', 121' an insertion unit 110 designed for installation in the receiving device 120 can be set in place from a defined seating direction which is indicated in FIG. 1 by the leg Z of an angled arrow. Furthermore, the two support arms 121', 121" and the two support arms 121', 121' of each respective plane comprises guide surface areas 124 that face each other.

The receiving device 120 is composed of a plurality of parts. For example, the two support arms 121' and 121" and the two support arms 121', 121' which are arranged, respectively, above one another can be implemented as die-punched sheet metal parts that are fastened to an intermediary part 128. The intermediary part 128 is connected to the holder device 130 by means of braces 133.

Arranged above the receiving device 120 is a drive device 150, which can actuate the mechanically movable parts of the insertion unit 110 by way of a drive shaft 151.

The insertion unit 110 comprises a housing 114. Seating locations 111 are formed on this housing which match in regard to their number and shape the support locations 123 that are present on the receiving device 120. The housing 114 further comprises recesses 112 which in regard to their number and shape match the protrusions 122. The seating locations 111 and the recesses 112 are arranged on the housing 114 in such a way that the receiving device 120 and the insertion unit 110 can be brought into form-fitting engagement with each other, analogous to the connection between an electrical plug and a receptacle. In an exemplary embodiment, this form-fitting engagement can be released only in the reverse direction of the seating direction Z.

As shown in FIG. 1, the seating location 111 and the recess 112 were created by means of a groove 114 that is formed on the housing 114 and whose bottom forms the counterpart surface area 115. The groove flank 116 on the opposite side from the seating location 111 as well as the counterpart surface 115 interact with the associated support arm 121', 121", 121', 121' to serve as an insertion aid for the user when setting the insertion unit 110 into the receiving device 120. As the insertion of the insertion unit is thereby guided in the direction indicated by the segment X of the angled arrow in FIG. 1, sensitive parts of the dosage-dispensing device, for example surveillance sensors arranged in the near vicinity of the receiving device 120, can be protected when inserting or retracting the insertion unit 110.

As the insertion unit 110 is in this case a dosage-dispensing unit, a delivery orifice 119 is arranged at the underside of the dosage-dispensing unit 110. A closure body which is not shown in the drawing is arranged inside the housing 114, constrained by bearings that allow rotation as well as linear displacement along the axis of rotation. This closure body, by means of which the aperture cross section of the delivery orifice 119 can be varied, can for this purpose be moved by way of a closure shaft 117. When the dosage-dispensing unit 110 is inserted in the receiving device 120, the closure shaft 117 can be connected to the drive shaft 151 through a coupler device. The insertion unit 110 further includes a source container 140 that is joined to the housing through a form-fitting connection which is releasable for replenishing the contents of the container. The housing 114 contains a delivery chute which is not visible in the drawing, which connects the source container 140 to the delivery orifice 119, so that the dosage substance in the source container 140 can get to the delivery orifice, for example propelled by gravity.

As shown in FIG. 1, the delivery orifice 119 is arranged below the grooves and thus also below the receiving device 120. With the given direction X-Z for the insertion, the dosage-dispensing device 110 cannot be put directly from above into the receiving device. This can have several different advantages. First of all, it can prevent damage that might be caused when inserting the dosage-dispensing unit 110 into the receiving device 120, for example through contact with parts of the dosage-dispensing device 100, in particular with the drive shaft 151. Furthermore, an additional measure of prevention can be achieved against the accumulation of deposits on the support location 123, since the delivery orifice 119 can never get into a position above the support locations 123 because of the defined direction X-Z for the insertion.

Figure 2:
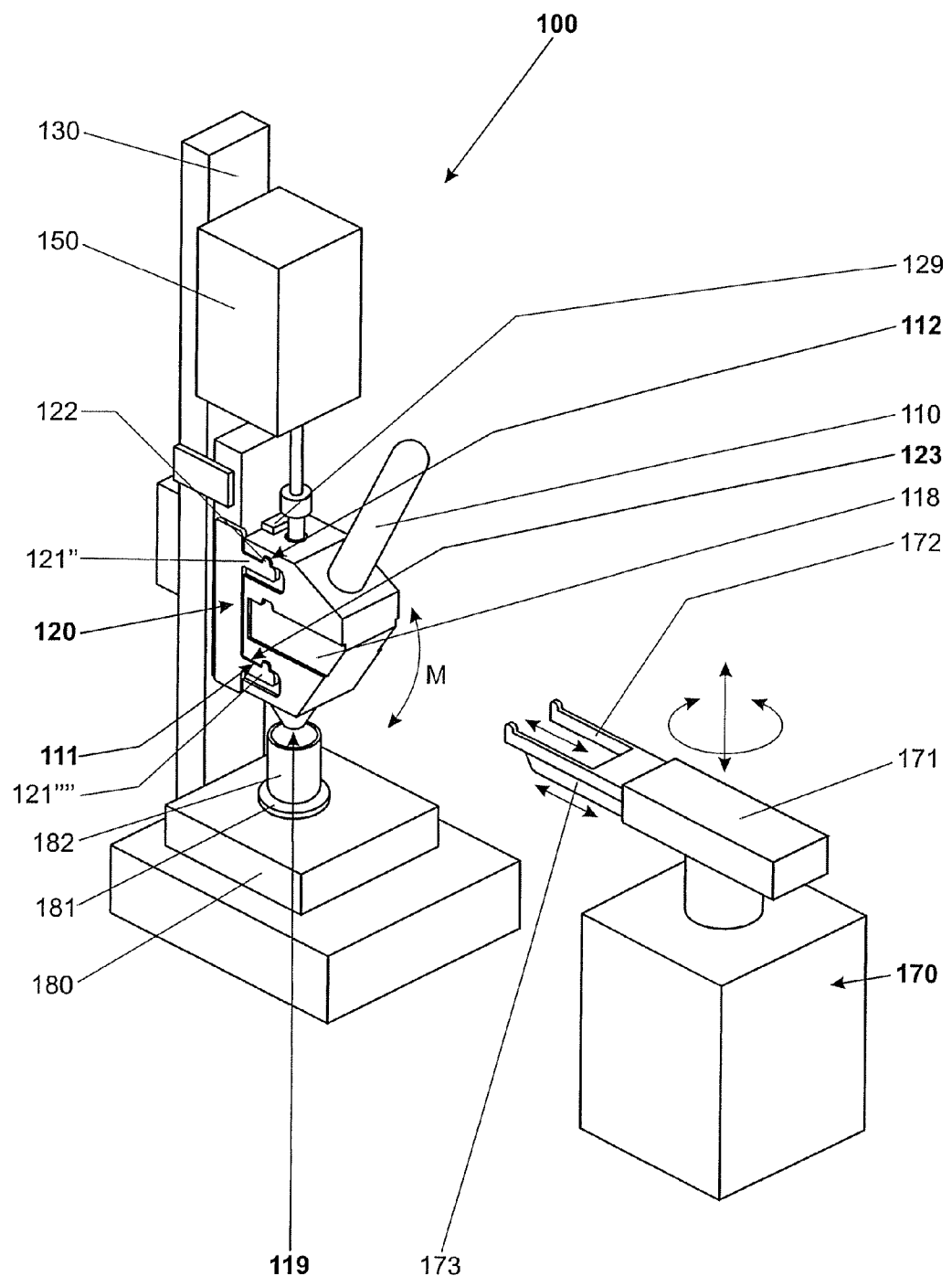
FIG. 2 is a schematic three-dimensional illustration of the exemplary dosage-dispensing device of FIG. 1 and of a handling device, wherein an insertion unit in a first embodiment, i.e. a dosage-dispensing unit for a dosage substance in powder- or paste form, is inserted in the receiving device and wherein a closure shaft of the dosage-dispensing unit is responsive to rotary actuation and coupled to a drive shaft of the drive device.

FIG. 2 presents a schematic three-dimensional view of the dosage-dispensing device 100 of FIG. 1 with an insertion unit 110 inserted in the receiving device 120. The description of the individual elements of FIG. 1 applies analogously to FIG. 2. A target container 182 is positioned on a load receiver 181 of the force-measuring device 180 exactly below the delivery orifice 119 of the insertion unit 110.

FIG. 2 shows clearly how the seating locations 111 of the insertion unit 110 rest on the support locations 123 of the receiving device 120. It can further be seen how the protrusions 122 reach into the recesses 112. With the arrangement of the support arms 121", 121' in two planes, the tipping moments M acting on the insertion unit can be effectively taken up and counteracted by the protrusions 122 without any loose play.

For reasons inherent in the design, it may be possible that a movement of the insertion unit 110 in the uninstalling direction cannot be prevented by coupling the insertion unit 110 to the drive device 150 or that in the process of uncoupling the insertion unit 110 is pulled out of the receiving device 120 in the uninstalling direction, for example due to a jamming of the coupling connection. To prevent this from happening, a locking element 129 with a linear slide path is arranged on the dosage-dispensing device 100 in an exemplary embodiment. After the insertion unit 110 has been inserted into place, the locking element is moved to the locking position that is shown in the drawing and is thus in form-fitting or force-locking engagement with the housing 114, whereby the insertion unit 110 is prevented from moving against the direction of gravity. When the insertion unit 110 needs to be removed, the locking element 129 is pulled straight back into a release position.

FIG. 2 furthermore schematically illustrates a handling device 170. The handling device 170 comprises a handling arm 171 capable of swiveling in a plane that is orthogonal to the direction of gravity. The handling arm 171 is further capable of linear movement in the direction as well as against the direction of gravity. The fork-shaped receiver element 172 of the handling arm 171 can be moved in and out in the direction of the longitudinal axis of the handling arm 171. By means of the handling arm 171 with its fork-shaped receiver element 172 which can reach into holder elements 118 that are formed on the housing 114 the process of installing and uninstalling an insertion unit 110 in the receiving device 120 can be automated. The holder elements 118 on the housing 114 basically have the form of grooves.

The handling arm 171 can further be equipped with a locking device 173 which enters into one of the groove-shaped holder elements 118 as shown in FIG. 2, thereby establishing a form-fitting or force-locking engagement that prevents the insertion unit 110 from falling out of the receiver element 172. Of course, instead of the handling device 170, one could also use industrial robots or so-called carousel conveyors of the kinds that are widely used in industry.

FIGS. 1 and 2 illustrate a first embodiment of an insertion unit 110. As has been described in detail hereinabove, this first embodiment is represented as a dosage-dispensing unit for dosage substances in powder- or paste form. Of course, other insertion units with other characteristics can also be installed and used in the dosage-dispensing unit. Further examples of insertion units are described in the following, with the understanding that the range of possibilities is not limited to these examples.

Figure 3:
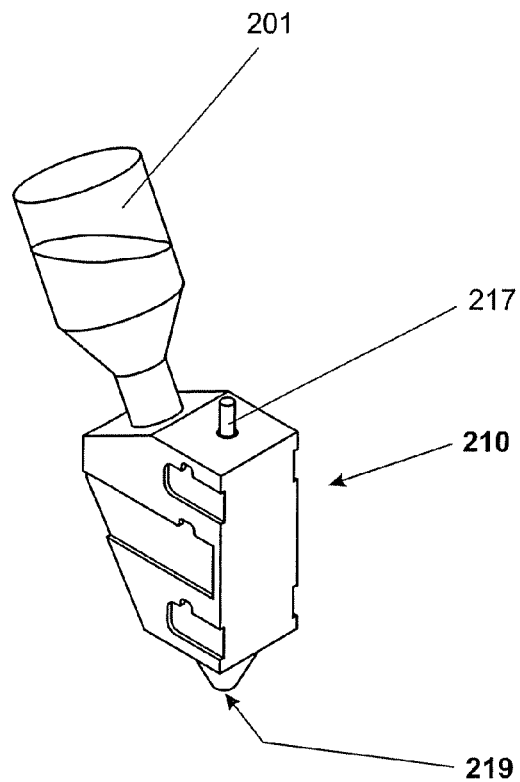
FIG. 3 is a three-dimensional illustration of an exemplary insertion unit in a second embodiment with a container holding a liquid.

FIG. 3 represents a three-dimensional illustration of an exemplary insertion unit 210 in a second embodiment with a container 201 which holds a liquid. Thus, the process of adding a liquid into a target container can take place directly from the dosage-dispensing device, for example in order to dissolve a pulverous substance that was dispensed beforehand with a dosage-dispensing unit into the target container. A closure shaft 217 is connected to a valve that is not shown in the drawing, whereby the flow rate of the liquid from a delivery orifice 219 can be influenced.

Figure 4:
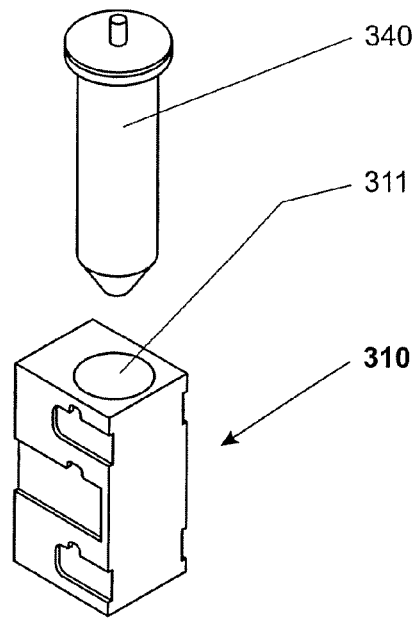
FIG. 4 is a three-dimensional illustration of an exemplary insertion unit in a third embodiment as an adapter that can be connected to a dosage-dispensing unit.

FIG. 4 represents a three-dimensional illustration of an exemplary insertion unit 310 in a third embodiment as an adapter. This insertion unit 310 which is configured as an adapter allows a broad diversity of function modules to be connected and used in the dosage-dispensing unit. Illustrated here as an example is a dosage-dispensing unit 340 whose function does not differ from the dosage-dispensing unit that was described above. The dosage-dispensing unit 340 in FIG. 4 is set into a bore hole 311 of the insertion unit 310 and secured with fastening means that are not shown here. Of course, the bore hole 311 represents only one of many possibilities to connect an adapter to a function module. As a matter of principle, individual elements on which seating locations and/or recesses are formed and which are fastened to a function module also fall under the concept of an adapter and are therefore part of the present disclosure.

Figure 5:
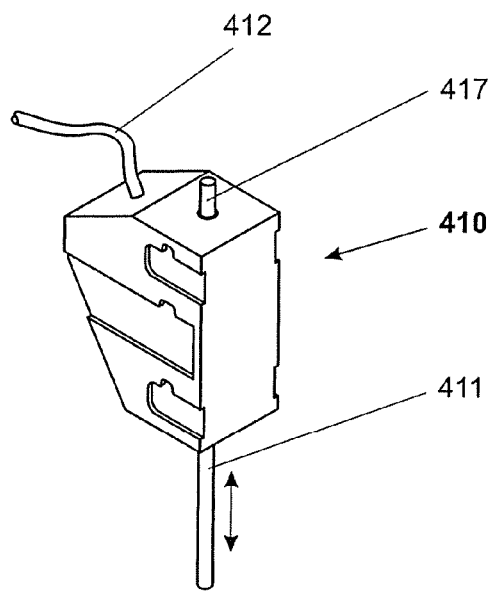
FIG. 5 is a three-dimensional illustration of an exemplary insertion unit in a fourth embodiment with a measuring sensor and a connecting cable.

FIG. 5 represents a three-dimensional illustration of an exemplary insertion unit 410 in a fourth embodiment with a measurement sensor 411 and a connecting cable 412. The measurement sensor 411 can be moved in as well as against the direction of gravity through a linear displacement of a shaft 417. The measurement sensor can be a pH sensor, a temperature sensor and the like. Of course, the transmission of the measurement signals generated by the measurement sensor 411 for example to a computer unit does not necessarily have to occur by way of a cable connection 412. Any of the state-of-the-art possibilities for a wireless transmission could likewise be used.

Figure 6:
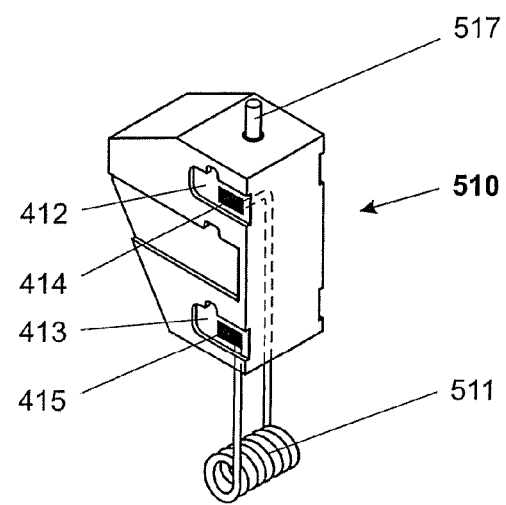
FIG. 6 is a three-dimensional illustration of an exemplary insertion unit in a fifth embodiment with a heater element and with two electrical contact terminals arranged in two counterpart surface areas.

FIG. 6 represents a three-dimensional illustration of an exemplary insertion unit 510 in a fifth embodiment with a heater element 511. The heater element 511 can be supplied with electrical energy through two electrical contact terminals 514, 515 which are arranged in two counterpart surface areas 512, 513. Of course, this also requires that means for conducting an electrical current be incorporated in the support arms of the receiving device. A shaft 517 can serve for example to actuate an electrical switch (not shown in the drawing) for turning the current to the heater element 511 on and off. Of course, the heater element 511 does not have to be shaped like the heating coil of an immersion heater. The heater element 511 is representative for a multitude of heater elements of different configurations as well as for cooling elements.

Figure 7:
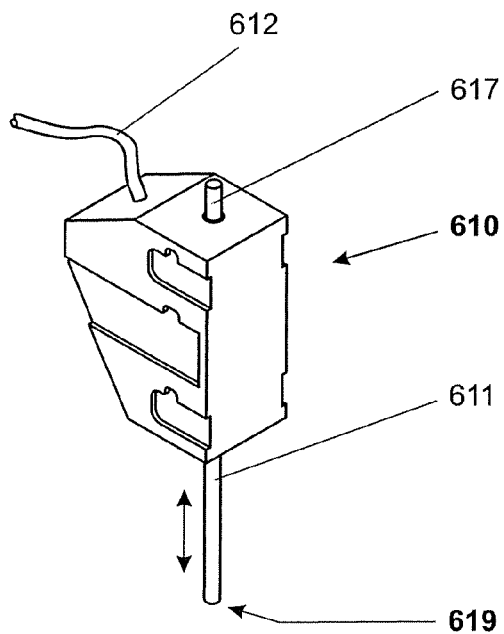
FIG. 7 is a three-dimensional illustration of an exemplary insertion unit in a sixth embodiment with a delivery tube and a connecting flexible conduit.

FIG. 7 represents a three-dimensional illustration of an exemplary insertion unit 610 in a sixth embodiment with a delivery tube 611 and a connecting hose 612 which leads for example to a burette. The delivery tube 611 is capable of a linear position adjustment in the direction of gravity as well as against the direction of gravity by way of a shaft 617, so that the delivery orifice 619 can be inserted into the fill opening of a target container.

Figure 8:
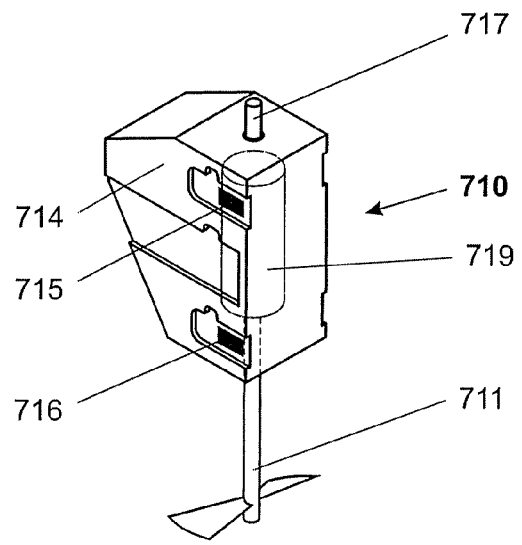
FIG. 8 is a three-dimensional illustration of an exemplary insertion unit in a seventh embodiment with a stirring device.

FIG. 8 represents a three-dimensional illustration of an exemplary insertion unit 710 in a seventh embodiment with a stirring device 711 which can be driven through the shaft 717 or by way of a motor 719 that is arranged in the housing 714. If a motor 719 is arranged in the housing 714, the electrical energy can be supplied to the motor through the contact terminals 715, 716 as has already been described for FIG. 6. Of course, one could also use other drive sources such as for example hydraulic or pneumatic drives, in which case appropriate connections can be arranged instead of the contact terminals 715, 716.

Figure 9:
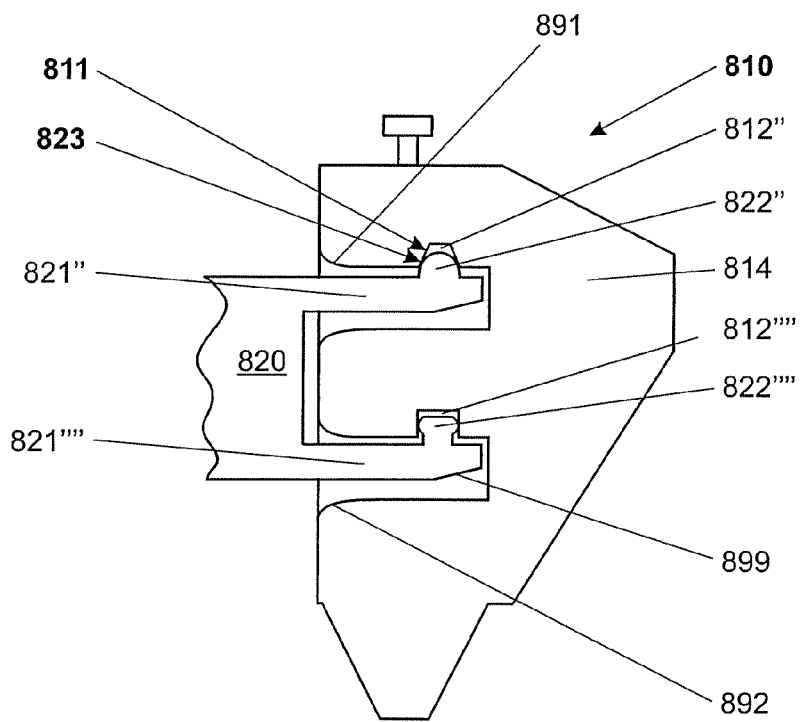
FIG. 9 is a schematic illustration of an exemplary receiving device in plan view, wherein only a part of the receiving device is shown and an insertion unit is inserted in the receiving device.

FIG. 9 represents a schematic illustration of am exemplary receiving device 820 in a plan view with only a part of the receiving device 820 being shown in the drawing, with a insertion unit 810 inserted in the receiving device 820. As shown in FIG. 9, the upper protrusion 822" of the upper support arm 821" differs in its shape from the lower protrusion 822' of the lower support arm 821'. While the lower protrusion 822' serves only to take up tipping moments and torques acting on the insertion unit 810 or, in other words, to position the insertion unit 810 in a plane that is orthogonal to the force of gravity, the upper protrusion 822" constitutes at the same time the support location 823. Differently shaped recesses 812", 812' are formed on the housing 814 of the insertion unit 810. The upper recess 812" is formed in a trapeze shape with the flanks of the trapeze forming the seating locations 811. As a result of this arrangement, one achieves a form-fitting and statically determinate, play-free connection between the insertion unit 810 and the receiving device 820.

Furthermore, insertion-aiding surfaces 891, 892 are arranged on the housing 814, and insertion-guiding flanks 899 are arranged on the support arms 821", 821', which facilitate the insertion of the insertion unit 810 by the user.

Although the disclosure has been described through the presentation of specific embodiments, its is obvious that further embodiments in numerous variations can be created from a knowledge of the present disclosure, for example by combining features from the individual embodiments with each other and/or exchanging individual function units of the embodiments. Accordingly, such combinations and alternatives are considered as part of the disclosure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS 100 dosage-dispensing device
810, 710, 610, 510, 410, 310, 210, 110 insertion unit
811, 111 seating location
812', 812", 112 recess
814, 714, 114 housing
513, 512, 115 counterpart surface area
116 flank
217, 117 closure shaft
118 holder element
619, 219, 119 delivery orifice
820, 120 receiving device
821', 821", 121', 121', 121", 121' support arm
822', 822", 122 protrusion
823', 123 support location
124 guide surface area
128 intermediary part 129 locking device
130 holder device
131 foot
133 brace
140 source container
150 drive device
151 drive shaft
170 handling device
171 handling arm
172 receiver element
173 locking device
180 force-measuring device
181 load receiver
182 target container
201 container
311 bore hole
340 dosage-dispensing unit
411 measurement sensor
412 cable connection
717, 617, 517, 417 shaft
511 heater element
716, 715, 514, 515 contact terminal
611 delivery tube
612 hose connection
711 stirring device
719 motor
891, 892 insertion-aiding surface
899 insertion-guiding flank

What is claimed is:

1. Receiving device in a dosage-dispensing device, configured to receive an insertion unit that can be inserted in the receiving device, wherein the receiving device comprises:
 a plurality of support arms that are arranged parallel to each other and extend in their lengthwise direction substantially orthogonal to a direction of gravity, wherein:
 at least two of said support arms are arranged in planes lying above one another relative to the direction of gravity;
 at least two of the support arms each comprise at least one support location, and in an operating state of a dosage-dispensing device the support locations are configured to support an insertion unit against a force of gravity by way of seating locations that are formed on the insertion unit;
 each support arm comprises at least one guide surface area and at least one protrusion configured to position the insertion unit in a plane that extends from the support location orthogonal to the direction of gravity, a main dimension of the protrusion being directed essentially against the direction of gravity;
 a locking element configured such that when an insertion unit is inserted in the receiving device, a movement of the insertion unit against the direction of gravity can be prevented; and
 when an insertion unit is inserted in the receiving device, the protrusions reach into recesses that are formed on the insertion unit.

2. Receiving device according to claim 1, wherein said receiving device comprises:
 four support arms and each of the support arms comprises a protrusion, wherein said support arms are arranged in pairs, with the support arms of each pair being located in a common plane and configured so that an insertion unit in its operating condition is arranged between the two support arms of each of the two planes.

3. Receiving device according to claim 1 in combination with an insertion unit which comprises:
 at least one delivery orifice which in an operating state is arranged below the support arms.

4. Receiving device according to claim 3, wherein each support arm comprises at least one guide surface area.

5. Receiving device according to claim 4, wherein each support arm is designed as a sheet metal part and a thickness of the support arms and the protrusion corresponds to a thickness of the sheet metal material.

6. Receiving device according to claim 5, wherein the receiving device comprises a locking element, configured such that when the insertion unit is inserted in the receiving device, a movement of the insertion unit against the direction of gravity can be prevented.

7. Receiving device according to claim 1, wherein each support arm is designed as a sheet metal part and a thickness of the support arms and the protrusion corresponds to a thickness of the sheet metal material.

8. Insertion unit in combination with the receiving device of claim 1, wherein the insertion unit is configured to be inserted in as well as removed from the receiving device, and wherein the insertion unit comprises:
 at least two seating locations, through which the insertion unit can be supported on the support locations of the support arms against the force of gravity; and
 at least two recesses formed on the insertion unit into which the protrusions of the support arms reach when the insertion unit is inserted in the receiving device.

9. Insertion unit according to claim 8, wherein the insertion unit comprises:
 at least two counterpart surface areas, wherein when the insertion unit is inserted in the receiving device said counterpart surface areas are brought into contact with guide surface areas of at least two of the support arms.

10. Insertion unit according to claim 9, wherein at least one counterpart surface area of the insertion unit as well as the guide surface area which in an operating state is in contact with said at least one counterpart surface area comprises electrically conductive terminals for transmission of signals and/or electrical energy.

11. Insertion unit according to claim 10, wherein said insertion unit is a dosage-dispensing unit for dosage substances in powder- or paste form, a titrator unit, a pump unit, a unit with pipe conduits and armatures, a container unit, a sensor unit, a heating- and/or cooling unit or an adapter serving to receive one of said units or to receive further units.

12. Insertion unit according to claim 11, comprising:
 at least one holder element is formed on the insertion unit or at least one holder element connected to the insertion unit; and
 a handling device for handling delivery of units to or removal of units from a dosage-dispensing device, said handling device having at least one receiver element which is configured for a form-fitting match with the holder element.

13. Insertion unit according to claim 8, wherein at least one counterpart surface area of the insertion unit as well as a guide surface area which in an operating state is in contact with said at least one counterpart surface area comprises electrically conductive terminals for transmission of signals and/or electrical energy.

14. Insertion unit according to claim 8, wherein said insertion unit is a dosage-dispensing unit for dosage substances in powder- or paste form, a titrator unit, a pump unit, a unit with pipe conduits and armatures, a container unit, a sensor unit, a heating- and/or cooling unit or an adapter serving to receive one of said units or to receive further units.

15. Insertion unit according to claim 8, comprising:
- at least one holder element formed on the insertion unit or at least one holder element connected to the insertion unit; and
- a handling device for handling delivery of units to or removal of units from a dosage-dispensing device, said handling device having at least one receiver element which is configured for a form-fitting match with the holder element.

16. Receiving device according to claim 1, wherein each support arm has a supported end and a free end and the at least one protrusion is spaced apart from the free end.

17. Dosage-dispensing device for substances in powder- or paste form, comprising:
- a holder device, wherein the holder device comprises at least one receiving device which includes:
  - a plurality of support arms that are arranged parallel to each other and extend in their lengthwise direction substantially orthogonal to a direction of gravity, wherein:
    - at least two of said support arms are arranged in planes lying above one another relative to the direction of gravity;
    - at least two of the support arms each comprise at least one support location, and in an operating state of a dosage-dispensing device the support locations are configured to support an insertion unit against a force of gravity by way of seating locations that are formed on the insertion unit;
  - wherein each support arm comprises at least one protrusion configured to position the insertion unit in a plane that extends orthogonal to the direction of gravity, a main dimension of the protrusion being directed essentially against the direction of gravity and when an insertion unit is inserted in the receiving device, the protrusions reach into recesses that are formed on the insertion unit; and
- an insertion unit in combination with the receiving device, wherein the insertion unit is configured to be inserted in as well as removed from the receiving device, and wherein the insertion unit comprises:
  - at least two seating locations, through which the insertion unit can be supported on the support locations of the support arms against the force of gravity; and
  - at least two recesses formed on the insertion unit into which the protrusions of the support arms reach when the insertion unit is inserted in the receiving device.

18. Dosage-dispensing device according to claim 17, comprising:
- a handling device which serves to insert the insertion unit in the receiving device as well as to remove the insertion unit from the receiving device, said handling device having at least one receiver element which is configured for a form-fitting match with a holder element of the insertion unit.

19. Dosage-dispensing device according to claim 18, wherein the receiver element comprises:
- a locking device serving for the form-fitting or force-locked connection between the handling device and the holder element, so that by means of the locking device the at least one insertion unit can be locked into the receiver element during a process of inserting the insertion unit in, or removing it from the receiving device.

* * * * *